Figure 1:
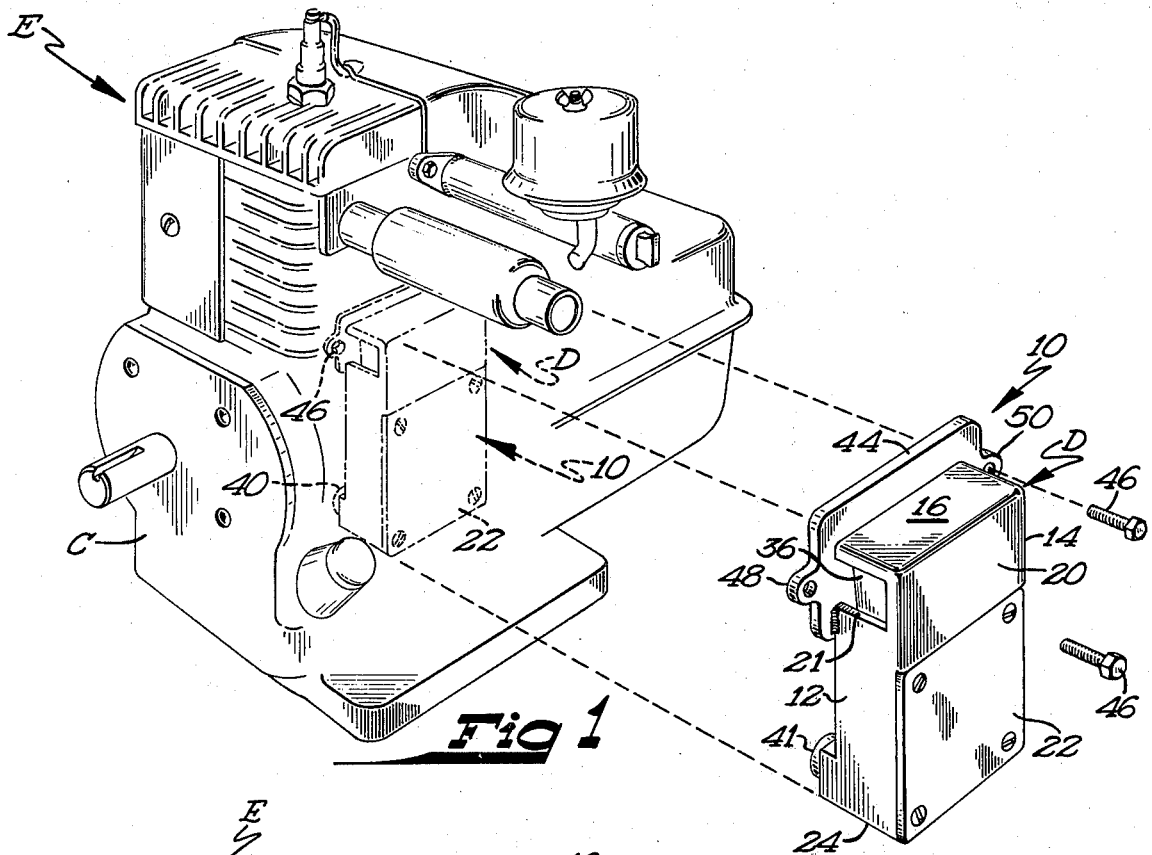

United States Patent [19]
Goserud

[11] 3,960,132
[45] June 1, 1976

[54] DEVICE FOR LUBRICATING AN INTERNAL COMBUSTION ENGINE WITH POWDERED GRAPHITE

[76] Inventor: Chester O. Goserud, 3205 Woodbridge St., St. Paul, Minn. 55112

[22] Filed: Jan. 13, 1975

[21] Appl. No.: 549,395

[52] U.S. Cl. .................... 123/196 CP; 184/6.24; 123/41.86
[51] Int. Cl.² ..................................... F01M 1/00
[58] Field of Search ............ 123/41.86, 134, 196 M, 123/196 CP; 184/6.24, 6.21, 1 R

[56] References Cited
UNITED STATES PATENTS

| | | | |
|---|---|---|---|
| 1,286,985 | 12/1918 | Freer | 123/41.86 |
| 1,306,421 | 6/1919 | Feltz | 123/41.86 |
| 1,877,668 | 9/1932 | Kidder | 123/196 M |
| 2,178,932 | 11/1939 | Daniels | 123/196 M |
| 2,216,106 | 10/1940 | Balkwill | 123/196 M |
| 2,493,617 | 1/1950 | Chubbuck | 123/41.86 |
| 3,229,591 | 1/1966 | Cadiou | 123/41.86 |

Primary Examiner—Charles J. Myhre
Assistant Examiner—James D. Liles
Attorney, Agent, or Firm—Wicks & Nemer

[57] ABSTRACT

A device for lubricating an internal combustion engine with powdered graphite including a housing having an inlet opening for connection with an outlet opening in the crankcase of an internal combustion engine. The housing also has an outlet opening for connection with an inlet opening of the crankcase of an engine together with means for connecting the inlet opening to the outlet opening of a crankcase and means for connecting the outlet opening to the inlet opening of a crankcase. The housing is also formed with a breather opening and has formed internally thereof a series of baffles for collecting graphite in the housing at areas therein prior to the outlet and the breather opening. Further provided is a one-way valve means in conjunction with the baffles for causing collected graphite to exit out the outlet of the housing and into the crankcase as the crankcase breathes.

5 Claims, 6 Drawing Figures

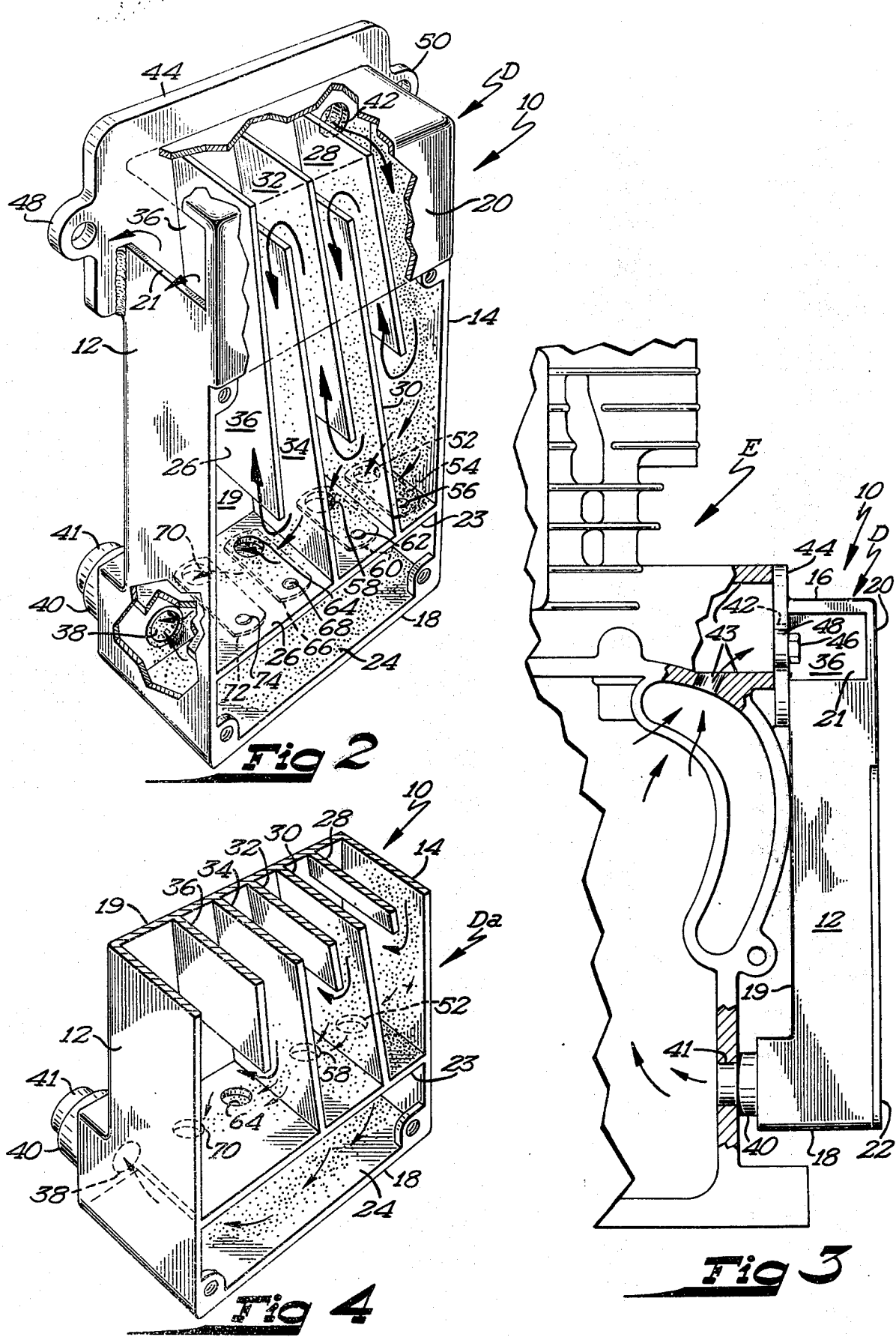

DEVICE FOR LUBRICATING AN INTERNAL COMBUSTION ENGINE WITH POWDERED GRAPHITE

SUMMARY

The invention relates to internal combustion engines and more particularly to the internal lubrication thereof. It is an object of the invention to provide a device that attaches to the crankcase of an internal combustion engine and which allows the lubrication of the engine with powdered graphite instead of conventional lubricating oil while the engine breathes in a conventional manner.

Referring to the drawings in detail, the letter E designates a conventional one cylinder internal combustion engine, e.g., a 3 H.P. Briggs & Stratton, Model 80232-0040. The letter D designates a device which when attached to the engine E allows the same to be lubricated by powdered graphite deposited in the crankcase C of the engine E. A form of graphite that may be used is Dixon No. 635 sold by the John J. Nosewick Co. of Minneapolis, Minnesota. The deveice D includes the housing 10 which has the spaced sidewalls 12 and 14 joined at the top by the top wall 16 and at the bottom with the bottom wall 18. The aforementioned walls are connected to a back wall 19, and a front wall 20 with the removable plate 22. Formed in the upper portion of the side wall 12 is a breather opening 21.

The numeral 23 designates an internal support wall spaced from the bottom wall thereby forming a lower chamber 24 and an upper chamber 26. Secured to the back wall and extending from the top wall 16 and into the chamber 26 is the first baffle plate 28 which extends approximately half way into the upper chamber 26. Further provided is the second baffle plate 30 secured at its lower end to the internal wall 23 and at its rear edge to back wall 19 and extending upwardly from the wall 23 to a point spaced from the top wall 16 and substantially parallel to the baffle 28. The numeral 32 designates a third baffle secured to the back wall 19 and extending from the top wall 16 and into the chamber 26 to a point removed from the internal support wall 23 and substantially parallel to the baffle 30. A further baffle 34 is connected at its lower end to the support wall 23, and it extends upwardly to a point spaced from the top wall 16 and substantially parallel to baffle 32. A fifth baffle 36 is provided which is secured to the back wall 19 and extends from the top wall and into the chamber 26 to a point removed from the wall 23.

Formed in the rear wall 19 and below the internal wall 23 is the exit opening 38 particularly FIGS. 2, 4, and 5 to which is connected the connecting tube 40 which is connected to an opening 41 in the crankcase. Secured to the sidewalls 12 and 14 and the top 16 is the mounting plate 44 formed with the opening 42 adjacent the upper edge of the rear wall between the baffle 28 and the sidewall 14. The opening 42 is in alignment with the outlet opening 43 of the crankcase. The mounting plate 44 is secured to the upper portion of the crankcase by a pair of bolts 46 through the lugs 48 and 50 with the tube 40 connected with the hole 41 leading into the crankcase.

The internal wall 23 is formed with the hole 52, between the baffle 30 and the sidewall 14 and mounted on the underside of the internal wall 23 is a one-way valve in the form of the thin spring 54 secured to the underside of the wall 23 by means of the rivet 56 with the free end of the spring in alignment with and covering the opening 52. The spring normally is upon the hole 52 and in closed relation. A further hole 58 is formed in the wall 23 between the baffles 30 and 34, and mounted on the underside of the wall 23 is a one-way valve in the form of the thin spring 60 secured to the wall 23 by means of the rivet 62 with the free end of the spring in alignment with and covering the opening 58.

A further hole 64 is formed in the wall 23 between the baffle 34 and a line extended from baffle 36. Mounted on the underside of the wall 23 is the one-way valve in the form of the thin spring 66 secured to the wall 23 by means of the rivet 68 with the free end of the spring in alignment with and covering the opening 64. A further and last opening 70 is formed in the wall 23 adjacent the opening 64, and mounted on the underside of the internal wall 23 is the one-way valve in the form of the thin spring 72 secured by means of the rivet 73 to the wall 23 with the free end of the spring in alignment with and covering the opening 70. The spring valves 54, 60, 66, and 72 are normally closed upon the holes 52, 58, 64, and 70, respectively, and have a thickness whereby the same are lifted off the holes as a result of the piston of the engine moving in its upward travel in the cylinder.

Figure 5:
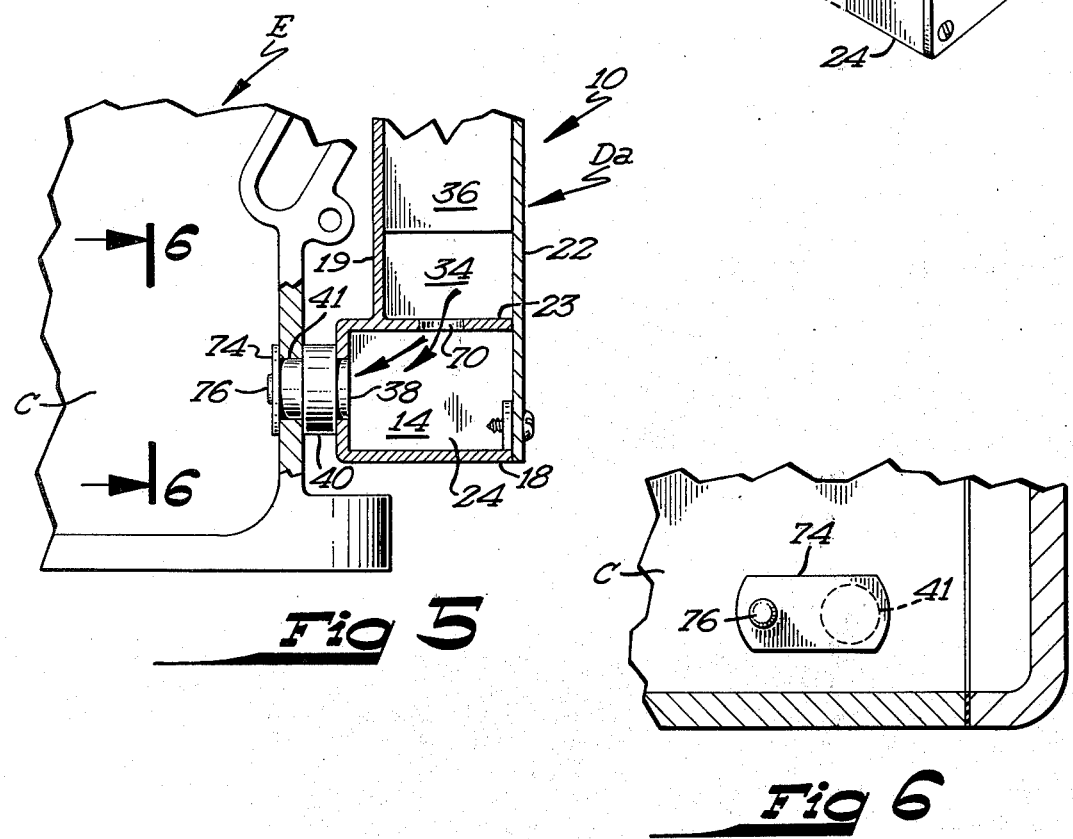
Figure 6:
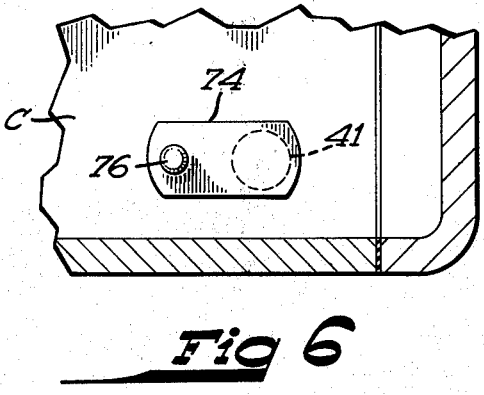

A further embodiment of the invention is found in particular in FIGS. 4, 5, and 6, wherein the device Da is identical to device D except that in device Da there are no spring valves 54, 60, 66, and 72 covering the holes 52, 58, 64, and 70, respectively. In the further embodiment is found the one-way valve in the form of thin flat spring 74 mounted on the inside of the crankcase C by means of the rivet 76 with the spring normally covering the opening 41, particularly FIGS. 5 and 6. The spring 74 is of a thickness whereby the same is lifted off the hole 41 as a result of the piston of the engine in its upward travel in the cylinder.

OPERATION

In operation of the engine E with the device D of the embodiment of FIGS. 1, 2, and 3 about 3 or 4 tablespoons of powdered graphite are placed in the crankcase C of the engine depending upon the size of the engine with the device D attached to the engine as in FIG. 1.

When the engine is operated, the graphite in the crankcase is stirred up and directed out of the crankcase with the flow of air through the opening 42 and into the housing 10 due to the downward movement or pumping action of the piston in the cylinder, and as the graphite leaves the opening 42 it enters the housing 10. The graphite is carried through the housing in the circuitous airflow path indicated by the arrows in FIG. 2 particularly, and the airflow without graphite is out breather opening 21.

As the graphite is carried through the housing 10 by the breathing airflow, portions of the same fall by gravity onto the wall 23 between the baffles where the graphite collects upon the wall 23 with progressively lesser amounts from the area of hole 52 to the area of hole 70 at which point there is no graphite left in the airflow, for all of the graphite has been collected on the wall 23. The length of the path of the flow of air and graphite is such that all the graphite in the airflow is collected before the airflow reaches the outlet 21. As a result, clean air exits out the opening 21 as the crankcase breathes through opening 21.

Alternately and upon the upward movement of piston of the engine the springs 54, 60, 66, and 72, are sucked away from the respective openings 52, 60, 66, and 70 as one-way valves whereby the graphite collected on the wall 23 is drawn through the openings into the chamber area 24 below the wall 23 and sucked out through the opening 38 and returned into the crankcase with the flow of air.

Briefly put, with a downward movement of the piston graphite-laden air flows into the housing 10 wherein the graphite is collected on the wall 23 with clean air flowing out through the breather opening 21. Then with an upward movement of the piston the springs 54 etc. are drawn away from the openings and the graphite collected on the wall 23 is sucked through the openings 52–70 and out the opening 38. With the above device and operation thereof the engine breathes without any introduction of graphite into the atmosphere outside of the engine. The graphite has a continuous uniform flow from and to the crankcase as the engine also "breathes".

In the embodiment of FIGS. 4, 5, and 6 graphite is placed in the crankcase. When the engine is operated and the piston is moved downwardly in the cylinder graphite laden air is forced out of the crankcase through the openings 43 and 42 and into the housing 10 where it travels the circuitous route through the housing. At the same time the spring 74 is caused to cover the hole 41 as a one-way valve. The graphite drops due to gravity and passes through the holes and collects on the bottom wall 18. This is the result of the staggered baffles, as air and graphite travel in an up and down motion, thus inducing gravity to influence the graphite. As the air passing through the housing reaches the breather hole 21 it is devoid of graphite which has collected as above. As a result the engine breathes through opening 21. When the piston moves upwardly, it draws the spring 74 from the hole 41 thereby sucking the graphite collected on wall 18 through the hole 41 and back into the crankcase.

I claim:

1. In combination with an internal combustion engine having a crankcase, a device for lubricating the internal combustion engine with powdered graphite comprising:
   a. a housing connected to the crankcase of the internal combustion engine externally thereof and having
   b. an inlet opening at one end of the housing for connection with an outlet opening in the crankcase of an internal combustion engine and
   c. an outlet opening at the other end for connection with an inlet opening of the crankcase of an engine;
   d. means for connecting said inlet opening of said housing to the outlet opening of a crankcase of an engine,
   e. means connecting said outlet opening of the housing to the inlet opening of a crankcase,
   f. a breather opening formed in said housing,
   g. means in said housing for collecting graphite carried by airflow through the housing from the inlet opening to the outlet opening and prior to said outlet of said housing and said breather opening, and
   h. valve means for causing the collected graphite in the housing to exit out said outlet of said housing.

2. The device of claim 1 in which
   a. said collecting means includes a multiplicity of baffles secured within said housing between said inlet opening and said outlet opening.

3. The device of claim 2 in which said valve means for causing the collected graphite to exit out said outlet includes a one way valve located at said outlet of said housing adapted to pass collected graphite from the housing into a crankcase upon upward travel of the piston of the engine.

4. The device of claim 1 in which said means for causing the collected graphite to exit out said outlet includes a one way valve located at said outlet of said housing adapted to pass collected graphite from the housing into a crankcase upon upward travel of the piston of the engine.

5. The device of claim 2 in which said collecting means includes
   a. a wall mounted in said housing,
   b. said wall having a series of spaced openings,
   c. A one way valve mounted on said wall at each of said openings adapted to pass collected graphite from the housing into a crankcase upon upward travel of the piston of the engine.

* * * * *